9125½X
P. Page,
Cook Stove.
Patented Sept. 20. 1835.
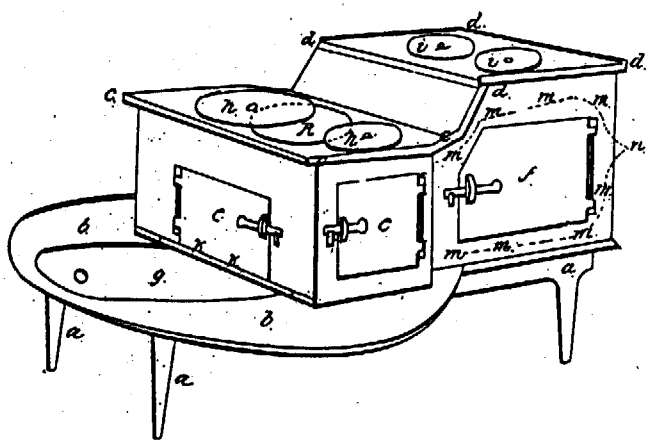
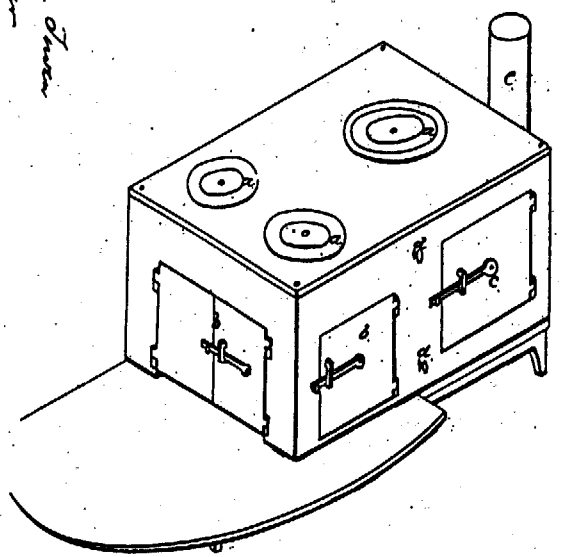
Witnesses:
Charlemagne Tower
Julius Tower
Inventor:
Putnam Page

9125½X 9-26-1835

David Gage (Assignor of Putnam Page) Marshall, New York.
Letters Patent, Dated September 26th 1835.

The Schedule referred to in these Letters Patent and making part of the same,
containing a description in the words of the said David Gage of his improvement in
a Cooking Stove by the name of Bool Stove.

( To all to whom these Presents shall come Be it known that I David Gage of
the Town of Marshall, (formally Kirkland) in the County of Oneida and State of New York
have invented a new and usefull improvement in a Cooking Stove known for many year
by the name of Bool Stove in this part of the Country this Stove is twenty one inches wide
eighteen inches high and thirty one inches long. A square oven with a grate in the
middle of it, a damper at the bottom of the oven to turn the fire over or under the oven;
a grate to the fire place half way up to the top of the Stove, the top plate of the Stove is level with places for three boilers with two doors at the fore end of the fire place and one at the side
of the fire and two oven doors and two dampers to cool the oven when too hot the smoke is
taken out at the back end of the stove. The top plate just covering the body of the stove; The
hearth straight on one side thirteen inches forward and four inches on the other side of the
wing. And the following is the improvement which I have invented and made on the
above described stove and for which I claim a title to by such invention; Is to lower
down the back part of the stove to thirteen inches high so to better confine the heat then
pitching the oven down to eight inches making the heat more even and the top of the
oven twelve inches wide, then running forward to the bottom, the bottom eighteen inch-
es so as to shorten the fire place or confine the heat and increase the heat in the oven
The grate in the oven is as before. The front plate of the oven and the bottom plate as far
back as the swill (about) four inches is cast together so as to prevent the oven bottom
from saging or cracking with the fire. The flew under the oven is one inch and three
fourths behind the oven is one inch and one fourth the flew before the oven is one inch
and one half. The forward part of the stove forward of the oven is let down to nine inches
high so as to make it much easier and more convenient getting on and off, heavy
furniture. It being nine inches high which contract the heat so as to forward the business.
The top of the stove is cast in two plates To prevent the back plates from cracking there is a
[illegible] in the flew cast on the forward top plate to divide the fire against each boiler and
prevent the top back plate from cracking. The [illegible] is cast on the forward plate. There is
a large open space in the forward top plate over the fire for the reception of various sized
cooking utentials When a five pail Kettle or other large boiler is on, there is two pieces
in the form a new moon to fill the vacant space on each side of the large boiler, when
the large boiler is not on, put on the division plate which makes place for two boilers
over the fire and two back; these are of different sizes and may be varied by the different
[illegible] to fit any sized boiler and separate plates to cover all or any part of the said open
space. The top plates project over the body of the stove, one inch and a half so as to
give proper strength against the boilers. The doors all being smaller. The oven doors
one eight inches high or wide and thirteen inches long the forward door is six inch-
es wide ten inches long, the side door is seven inches square. The hearth widens out
from the fore end of the oven and formes an ovel crossways of the stove forty five
inches, then running forward of the body sixteen inches which formes an ovel.

Then there is a singue in the bottom of the hearth about three inches deep sixteen inches wide and twenty six inches long. The form of this singue is ovel to prevent the hearth or the plates from cracking with the fire. The smoke is taken out of the back end of the stove with in one inch of the top, the funnel to be eight inches diameter; The above forms I have calculated to use in various sises of Stoves The intire object of the above improvement is first to forward the speed and convenency in cooking and washing and other business, secondly to save a great proportion of the fuel usuly take and required in other stoves. Thirdly from its durability, each plate being so shaped and constructed as not to be broken or cracked by the heat of the fire.

Witnesses
T. Dean
Philena H. Dean

Drawing in [illegible]

David Gage

Dated at Marshall, June 5th 1830.

(900 wds)

Rcd [illegible]